United States Patent
Hedges et al.

(10) Patent No.: US 12,031,518 B2
(45) Date of Patent: Jul. 9, 2024

(54) CONNECTION FOR SPLIT WIND TURBINE BLADE

(71) Applicant: Vestas Wind Systems A/S, Aarhus N. (DK)

(72) Inventors: Andrew Hedges, London (GB); James Smith, Ryde (GB); Peter Bøttcher, Egå (DK); Jens-Jørgen Hansen, Højbjerg (DK)

(73) Assignee: Vestas Wind Systems A/S, Aarhus (DK)

( * ) Notice: Subject to any disclaimer, the term of this patent is extended or adjusted under 35 U.S.C. 154(b) by 294 days.

(21) Appl. No.: 17/630,694

(22) PCT Filed: Jul. 28, 2020

(86) PCT No.: PCT/DK2020/050220
§ 371 (c)(1),
(2) Date: Jan. 27, 2022

(87) PCT Pub. No.: WO2021/018362
PCT Pub. Date: Feb. 4, 2021

(65) Prior Publication Data
US 2022/0260051 A1 Aug. 18, 2022

(30) Foreign Application Priority Data
Jul. 30, 2019 (DK) ............. PA 2019 70485

(51) Int. Cl.
*F03D 80/00* (2016.01)
*F03D 1/06* (2006.01)

(52) U.S. Cl.
CPC ........ *F03D 1/0675* (2013.01); *F05B 2230/60* (2013.01); *F05B 2240/302* (2013.01); *F05B 2260/301* (2013.01)

(58) Field of Classification Search
CPC ............. F03D 1/0675; F05B 2240/302; F05B 2260/301
See application file for complete search history.

(56) References Cited

U.S. PATENT DOCUMENTS

2009/0324420 A1* 12/2009 Arocena De La Rua ................. B29D 99/0025
264/274
2012/0141287 A1 6/2012 Hynum et al.

FOREIGN PATENT DOCUMENTS

| CN | 105464898 A | 4/2016 |
| CN | 106438192 A | 2/2017 |

(Continued)

OTHER PUBLICATIONS

Machine translation of CN105464898A, accessed Jan. 12, 2024. (Year: 2024).*
Machine translation of CN106438192A, accessed Jan. 12, 2024. (Year: 2024).*
Danish Patent and Trademark Office Search and Examination Report in PA 2019 70485, Jan. 27, 2020.

(Continued)

*Primary Examiner* — Jonathan R Matthias
(74) *Attorney, Agent, or Firm* — Wood Herron & Evans LLP (57) ABSTRACT

A wind turbine blade comprising: a first blade portion having a shell that defines a suction side, a pressure side, a leading edge, and a trailing edge of the blade, the first blade portion further including a first blade portion end surface at one end of the first blade portion; a second blade portion having a shell that defines a suction side, a pressure side, a leading edge, and a trailing edge of the blade, the second blade portion further including a second blade portion end surface at one end of the second blade portion, wherein the first blade portion and the second blade portion are configured to be coupled together at the first and second blade portion end surfaces; and a connection joint for coupling the first and second blade portions together, wherein the connection joint includes: a first insert embedded in the first (Continued)

blade portion; a fitting integral with the first insert and projecting from the first blade portion end surface toward the second blade portion end surface; a second insert embedded in the second blade portion; and a fastener arranged to fasten the second insert to the fitting.

25 Claims, 11 Drawing Sheets

(56) References Cited

FOREIGN PATENT DOCUMENTS

| | | |
|---|---|---|
| CN | 109944736 A | 6/2019 |
| EP | 0836015 A2 | 4/1998 |
| EP | 2138716 A1 | 12/2009 |
| EP | 2631478 A1 | 8/2013 |
| EP | 2674612 A1 | 12/2013 |
| WO | 2012140048 A2 | 10/2012 |
| WO | 2015051803 A1 | 4/2015 |
| WO | 2015154776 A1 | 10/2015 |

OTHER PUBLICATIONS

European Patent Office, International Search Report and Written Opinion in PCT Application No. PCT/DK2020/050220, Oct. 16, 2020.
European Patent Office, examination report issued in corresponding EP Application No. 20753672.3, dated Feb. 14, 2024.

\* cited by examiner

CONNECTION FOR SPLIT WIND TURBINE BLADE

FIELD OF THE INVENTION

The present invention relates to a wind turbine blade, and a method of manufacturing such a wind turbine blade.

BACKGROUND OF THE INVENTION

As wind turbine blade lengths increase, it has become desirable to manufacture and transport blades as separate portions and to construct the blades on a site closer to the wind turbine, or when a portion of the blade is fixed to a hub of a wind turbine. Existing methods of connecting span-wise blade sections commonly involve a high number of parts, which require very accurate machining and have complex constructions.

The aim of the present invention is to provide a wind turbine blade with joinable portions, which has a low parts count, making the joint easier to manufacture and join, with better load transfer across the blade.

SUMMARY OF THE INVENTION

A first aspect of the invention provides a wind turbine blade comprising: a first blade portion having a shell that defines a suction side, a pressure side, a leading edge, and a trailing edge of the blade, the first blade portion further including a first blade portion end surface at one end of the first blade portion; a second blade portion having a shell that defines a suction side, a pressure side, a leading edge, and a trailing edge of the blade, the second blade portion further including a second blade portion end surface at one end of the second blade portion, wherein the first blade portion and the second blade portion are configured to be coupled together at the first and second blade portion end surfaces; and a connection joint for coupling the first and second blade portions together, wherein the connection joint includes: a first insert embedded in the first blade portion; a fitting integral with the first insert and projecting from the first blade portion end surface toward the second blade portion end surface; a second insert embedded in the second blade portion; and a fastener arranged to fasten the second insert to the fitting.

Compared to a joint where the fitting is not integral with the first insert, less milling is required for manufacturing a joint according to the present invention. When a blade portion is made, the ends of each of the inserts must be milled to ensure that they are coplanar. If the first insert and the fitting were manufactured separately, then two pairs of abutting faces (i.e. the faces of both inserts and the corresponding faces of the fitting) would need to be milled to a fine tolerance. However, with the present invention, each connection joint may have only a single pair of abutting faces that require milling and therefore the amount of milling required is less.

In a joint where the fitting is not integral with the first insert, the fitting may have a hole, which may be a clearance hole through which a fastener may pass for connecting the fitting and the first insert. With a separate fitting, the fitting would have freedom of movement in both a chordwise and through-thickness direction. The present invention restricts these degrees of freedom of the fitting.

Further, were a second fastener required for coupling the fitting to the first insert, then two nuts would also be required to be placed inside the fitting, thereby restricting space for placing a tool against each of the nuts. Therefore, the present invention improves accessibility of the nut.

The fitting between the first and second blade portion end surfaces allows the blade portions to be bolted together while allowing access to the fitting from the outside of the blade. The arrangement may also have an exterior profile which fits within the profile of the blade portions and may therefore have a good aerodynamic profile.

With this connection joint, there may be only a single pair of abutting surfaces within each connection joint. Therefore, by comparison to connection joints with multiple abutting surfaces per connection joint, the connection joint may be more tolerant to manufacturing inaccuracies. At the same time, the distance between the first and second blade portion end surfaces may be small, as a single fitting may extend between the first and the second blade portion end surfaces. This may provide an efficient load transfer and a low weight of the joint.

The joint may also have a low parts count and thereby allow more simple construction.

The second insert may have an internal bore having a threaded portion for receiving an end of the fastener, the internal bore may preferably also have an unthreaded portion for receiving the fastener.

The fitting may have a first end wall integral with the first insert and a second end wall opposite the first end wall, the second end wall having a through hole for receiving the fastener.

The fitting may further comprise at least two side walls extending between the first and second end walls.

The wind turbine blade may further comprise a nut, the fastener may have an external thread, and tightening the nut may clamp the second insert against the second end wall of the fitting. The fitting may abut the second insert.

The nut may be adapted to clamp the second insert against the second end wall of the fitting by tensioning the fastener without exerting torque on the fastener.

The nut may be expandable in a direction along the fastener. The nut may be adapted to receive a tool on an end face of the nut only.

The fitting may be at least partially open or openable between the two side walls for receiving a tool for tightening the nut and may have a covered base and/or top between the two side walls. The base and/or top may be removable. The fitting may be at least partially open or openable between the two side walls from two opposite faces of the fitting, and there may optionally be a passage through the fitting from a first openable space to a second openable space, the passage extending between the two side walls. The side walls may have a cross section which increases in dimension towards a middle of the fitting between the end walls, preferably the side walls may have constant thickness. The side walls of the fitting may be considered as having a height, which is a dimension of the side walls perpendicular to the span-wise and chord-wise directions of the blade, and the height of the side walls may increase towards a midpoint between the first blade end surface and the second blade end surface.

The fastener may comprise a threaded rod. The fastener may be a stud, a bolt or a shaft.

The first insert and/or the second insert may have an undulating outer surface. The undulating outer surface may have a plurality of grooves and ridges.

The second insert may include a second bushing.

The inserts and/or the bushing may be metallic.

The second bushing may extend into the second blade portion further than the first insert extends into the first blade portion.

The second insert may be longer than the first insert.

The first insert and/or the second insert may be secured within respective elongate fibre composite bodies, each body having a taper, and the respective bushings may be embedded at one end of the respective elongate fibre composite bodies.

The first insert and/or the second insert may be integrated within an end face of a spar cap of the respective first and/or second blade portions.

The connection joint may be asymmetric about a plane midway between the first and the second blade portion end surfaces. In particular, the fitting may extend from the first blade portion end surface to the second blade portion end surface and may be integral with the first insert and may abut and be fastened to the second insert.

The first and the second blade portion end surfaces may be spaced apart and the fitting may extend between the first and the second blade portion end surfaces.

The wind turbine blade may further comprise at least one further connection joint for coupling the first and second blade portions together, wherein each of the further connection joints may include: a respective first insert embedded in the first blade portion; a respective fitting integral with the respective first insert and projecting from the first blade portion end surface from towards the second blade portion end surface; a respective second insert embedded in the second blade portion; and a respective first fastener for fastening the respective second insert to the fitting. The further connection joint may therefore be substantially similar to the first mentioned connection joint.

According a second aspect of the present invention there is provided a method of manufacturing a wind turbine blade comprising: providing a first blade portion having a shell that defines a suction side, a pressure side, a leading edge, and a trailing edge of the blade, the first blade portion further including a first blade portion end surface at one end of the first blade portion, with a first insert embedded in the first blade portion at the first blade portion end surface, and a fitting integral with the first insert; providing a second blade portion having a shell that defines a suction side, a pressure side, a leading edge, and a trailing edge of the blade, the second blade portion further including a second blade portion end surface at one end of the second blade portion, with a second insert embedded in the second blade portion at the second blade portion end surface; bringing the first and second blade portions together such that the fitting projects from the first blade portion end surface toward the second blade portion end surface; and fastening the second insert to the fitting with a fastener so as to couple the first blade portion and the second blade portion together at the first and second blade portion end surfaces.

With such a method, there is provided a convenient method for coupling together separate portions of a wind turbine blade.

BRIEF DESCRIPTION OF THE DRAWINGS

Embodiments of the invention will now be described with reference to the accompanying drawings, in which.

DETAILED DESCRIPTION OF EMBODIMENTS

In this specification, terms such as leading edge, trailing edge, pressure side, suction side, thickness, chord and planform are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction.

A pressure side (or windward surface) of a wind turbine blade is a surface between the leading edge and the trailing edge, which, when in use, has a higher pressure than a suction side of the blade.

A suction side (or leeward surface) of a wind turbine blade is a surface between the leading edge and the trailing edge, which will have a lower pressure acting upon it than that of a pressure side, when in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

A view which is perpendicular to both of the spanwise and chordwise directions is known as a planform view. This view looks along the thickness dimension of the blade.

The term spar cap is used to refer to a longitudinal, generally spanwise extending, reinforcing member of the blade. The spar cap may be embedded in the blade shell, or may be attached to the blade shell. The spar caps of the windward and leeward sides of the blade may be joined by one or more shear webs extending through the interior hollow space of the blade. The blade may have more than one spar cap on each of the windward and leeward sides of the blade. The spar cap may form part of a longitudinal reinforcing spar or support member of the blade. In particular, the first and second spar caps may form part of the load bearing structure extending in the longitudinal direction that carries the flap-wise bending loads of the blade.

The term shear web is used to refer to a longitudinal, generally spanwise extending, reinforcing member of the blade that can transfer load from one of the windward and leeward sides of the blade to the other of the windward and leeward sides of the blade.

Figure 1:
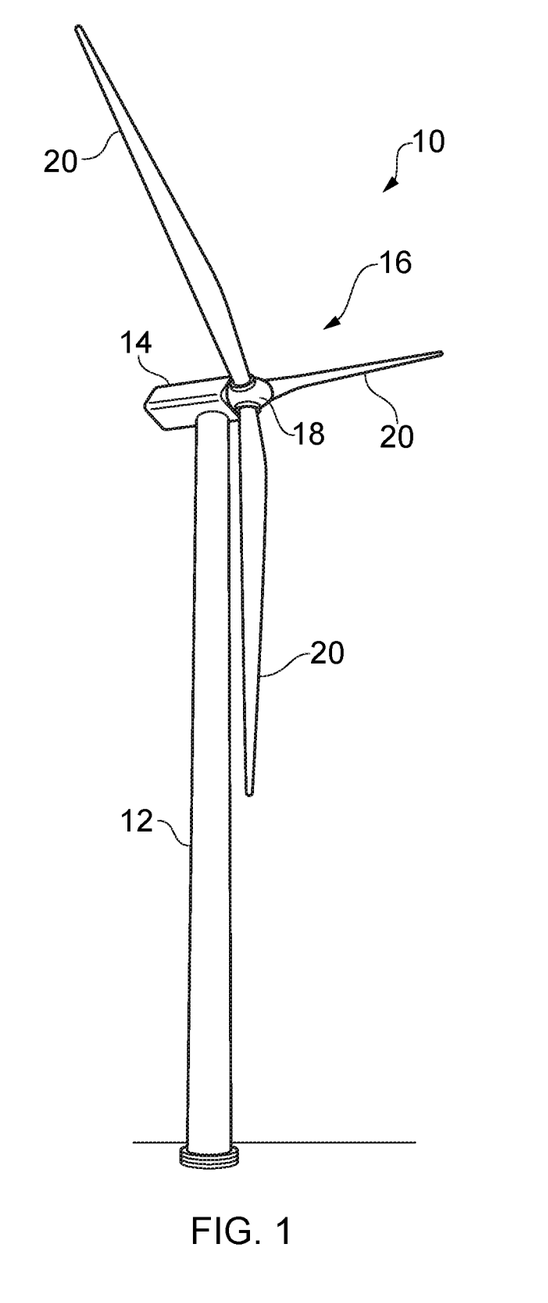
FIG. 1 shows a wind turbine.

FIG. 1 shows a wind turbine 10 including a tower 12 and a nacelle 14 disposed at the apex of the tower 12.

A rotor 16 is operatively coupled via a gearbox to a generator (not shown) housed inside the nacelle 14. The rotor 16 includes a central hub 18 and a plurality of rotor blades 20, which project radially outwardly from the central hub 18. While the embodiment shown in FIG. 1 has 3 blades, it will be realised by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
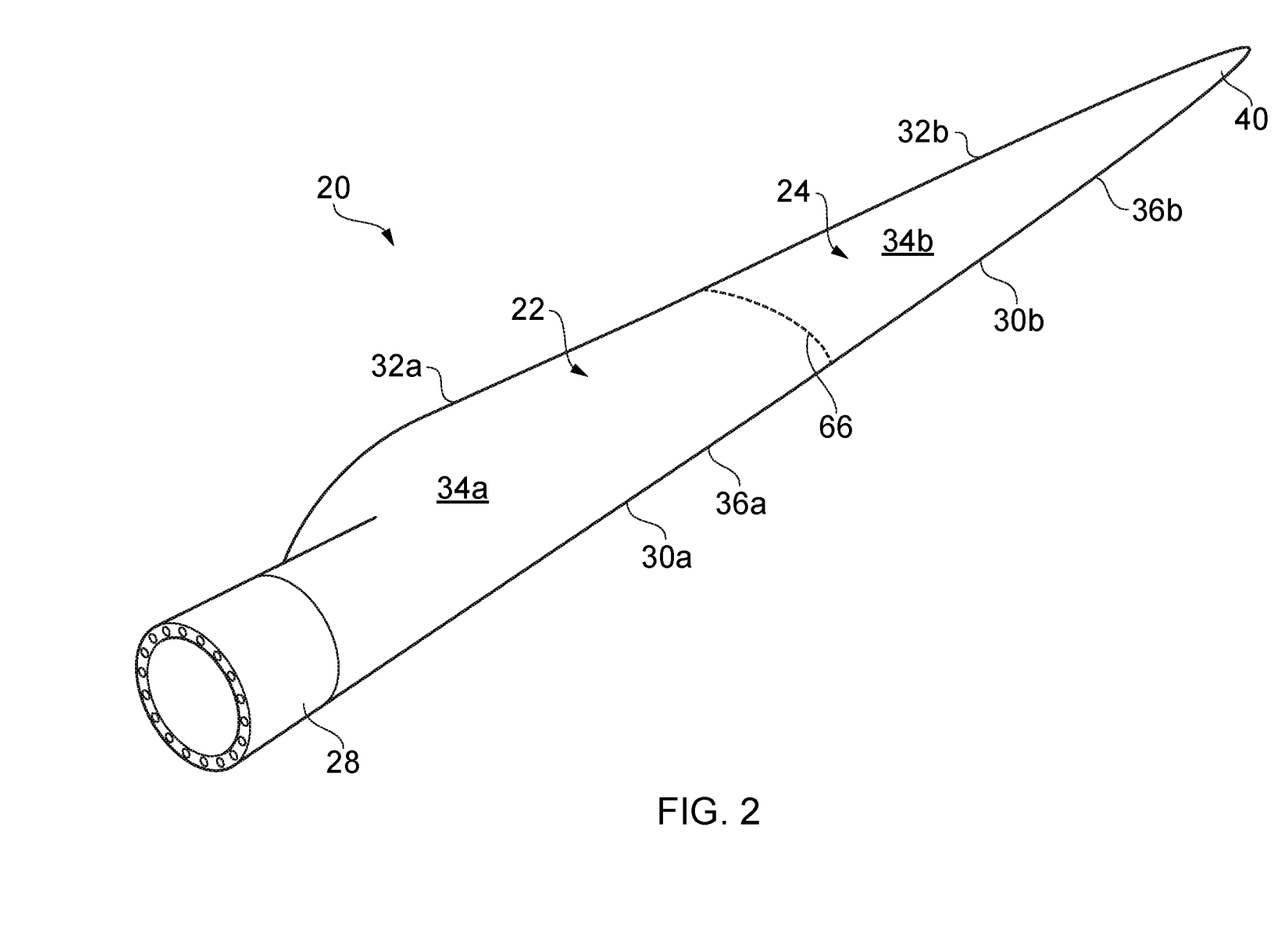
FIG. 2 shows a blade of the wind turbine of FIG. 1.

FIG. 2 is a view of one of the blades 20. The blade 20 extends from a generally circular root 28 to a tip 40 in a longitudinal "spanwise" direction, and between a leading edge 36a, 36b and a trailing edge 32a, 32b, in a transverse "chordwise" direction. The blade 20 comprises a suction surface 30a, 30b, and a pressure surface 34a, 34b. A thickness dimension of the blade extends between the suction surface 30a, 30b and the pressure surface 34a, 34b.

The blade 20 is a split wind turbine blade formed of a first portion 22 and a second portion 24, which may be connected at a connection joint indicated by connection line 66. The connection line 66 between the first and second blade portions 22, 24 may be a spanwise split, with the connection line 66 being chordwise.

As will be described below, each wind turbine blade portion 22, 24 may be manufactured separately and may each have all their electrical connections, e.g. for lightning strike and equipotential bonding between the lightning protection system and conductive blade components, made at the time of manufacture. Each blade portion is then transported to a site for erection of the wind turbine. The blade portions are then joined together at the erection site to form the completed blade 20 before each blade is mounted to the hub 18 to form the rotor 16 of the wind turbine. The blades 20 may also be coupled while a portion of the blade 20 is connected to the hub 18. This can reduce the load which is needed to be lifted by a crane and can also allow replacement of only a portion of a blade, for example if a tip portion has been damaged. Joining the blade portions 22, 24 together may create the required electrical connections between the blade portions.

The first blade portion 22 has a pressure surface 34a, a leading edge 36a, a suction surface 30a and a trailing edge 32a. The first blade portion 22 extends from the blade root 28 to the connection line 66. The blade 20 also comprises a second blade portion 24, extending from the blade connection line 66 to the blade tip 40 and the second blade portion 24 has a pressure surface 34b, a leading edge 36b, a suction surface 30b and a trailing edge 32b. The connection joint may be covered by a fairing, which may provide a surface over the joint with minimal worsening of the aerodynamic profile of the two blade portions.

While the example shown in FIG. 2 has two blade portions, it will be understood that a blade may have three or more blade portions with a connection joint between adjacent blade portions.

While the first wind turbine blade portion 22 is showing as being nearer the root of the blade 20 and second wind turbine blade portion 24 is shown as being nearer the tip of the wind turbine blade 20, the labels "first" and "second" are not intended to be limiting and any specific property disclosed as being associated with the first or second wind turbine blade portion may be applied to the other wind turbine blade portion.

Figure 3:
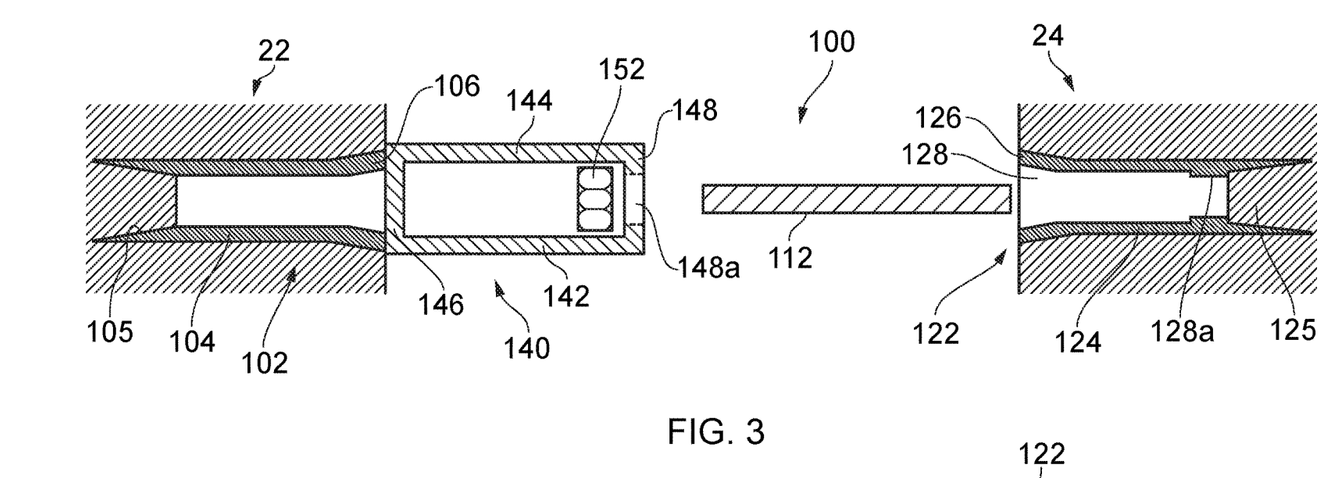
FIG. 3 shows a schematic diagram of a connection joint within the blade of FIG. 2.
Figure 4:
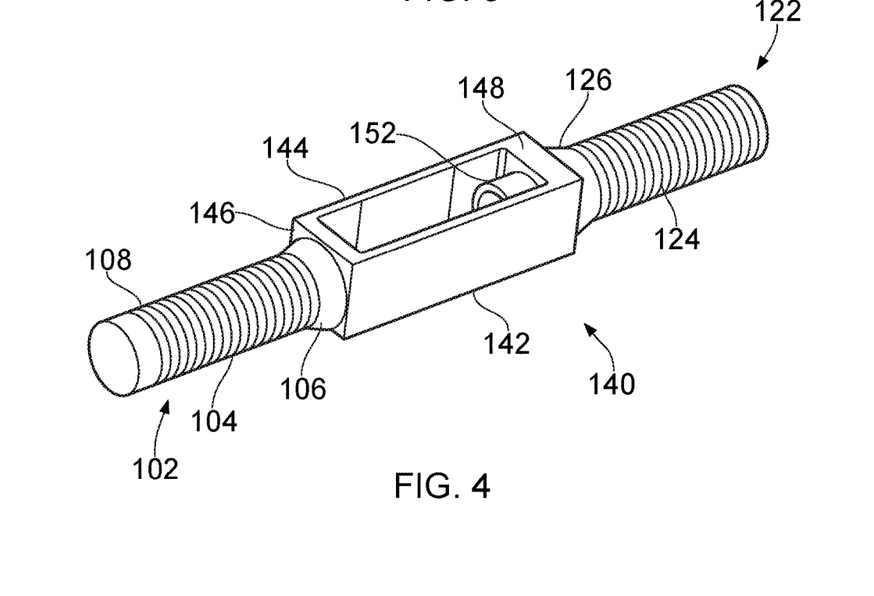
FIG. 4 shows a perspective view of certain components of the wind turbine blade joint.
Figure 5:
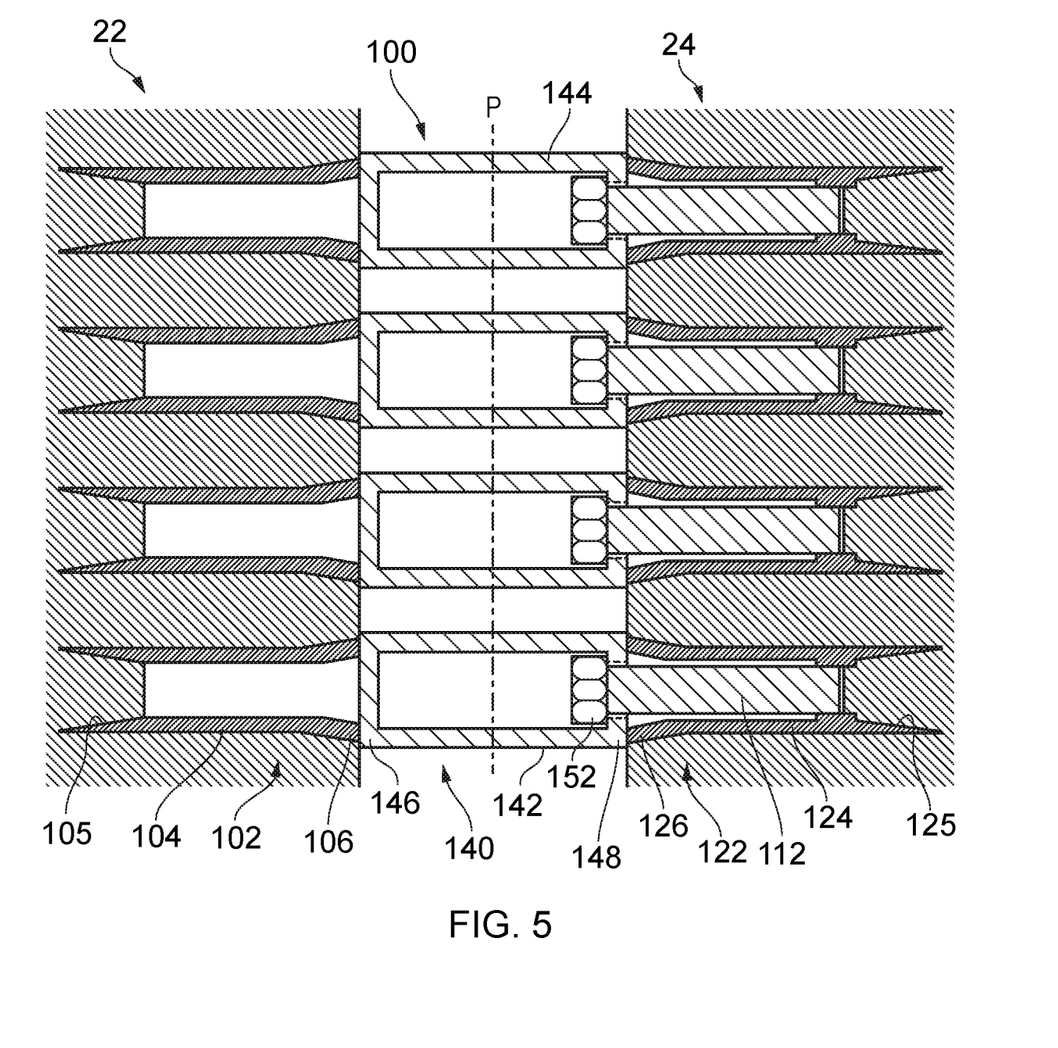
FIG. 5 shows a plan view of a joint between two wind turbine blade portions.

FIG. 3 shows (in an exploded cross-sectional plan view) a connection joint 100 between the first blade portion 22 and the second blade portion 24. FIG. 4 shows a perspective view of the connection joint, with the blade portions removed for clarity. FIG. 5 shows how multiple joints 100 may be disposed next to each other, between the first and second blade portions 22, 24.

Referring to FIGS. 3, 4 and 5, the connection joint 100 is formed, in general terms, of a first insert 102 embedded in the first blade portion 22 at an end surface thereof, and a fitting 140 integral with the first insert 102, on a first side of the joint; and a second insert 122 embedded in the second blade portion 24 at an end surface thereof, on a second side of the joint. The fitting 140 and the second insert 122 are coupleable by a fastener 112. The fastener 112 may be a rod, a bolt, or a stud and may generally comprise a threaded shaft. The fastener 112 may be secured to a nut 152 disposed within the fitting 140 at a first end and may be secured within the second insert 122 at a second end. The nut 152 may be a hexagonal nut with an inner threaded hole through which the fastener 112 extends. The nut 152 may be fastened to the fastener 112 by rotation of the nut 152 about the fastener 112, by exerting a torque on the nut 152 by engaging a tool with a side face of the nut 152. The nut 152 is arranged to secure the fastener 112 and to abut the second end wall 148 of the fitting 140, although the abutment may be indirect, such as via one or more washers.

The first insert 102 may comprise a bushing 104, which may also be a substantially cylindrical tube or shaft having an undulating or convoluted outer surface. The outer surface of the bushing 104 may have a plurality of roughness elements, such as grooves and ridges. The undulating outer surface may provide a good mechanical connection to the blade portion in which it is embedded. The bushing 104 may be connected to a fitting 140 via a flared portion 106 integral with the shaft 104, although the flared portion 106 may be omitted and the shaft 104 may be directly connected to the fitting 140. The flared portion 106 may be frusto-conical portion, and may have a cross section which increases towards the fitting 140. The fitting 140 may be integral with the first insert 102, such as being welded to the first insert 102. Although the term "bushing" is used, the bushing 104 may have no inner surface for receiving another part.

FIG. 3 is a cross-sectional plan view of the joint, and it can be seen that the fitting 140 may have a box section shape, which may also be referred to as a rectangular annulus. The fitting 140 may have a first end wall 146, which is integral with the first insert 102, and a second end wall 148, opposite the first end wall 146 and parallel with the first end wall 146. In this embodiment, the first and second end walls 146, 148 are connected via side walls 142, 144. However, the end walls 146, 148 may alternatively be connected via beams or rods. The fitting 140 may be asymmetric about a plane P (see FIG. 5) at a midpoint of the fitting 140, since the fitting 140 is integral with the first insert 102 and is fastened to and arranged to abut the second insert 122. For this reason, the fitting may have a hole 148a in exactly one end wall 148.

The hole 148a may extend through the second end wall 148, for receiving the fastener 112. The fastener 112 may be received in the second insert 122. The second insert 122 may comprise a bushing 124 which may have an undulating or convoluted outer surface comprising ridges or grooves. The undulating outer surface may provide a good mechanical connection to the blade portion in which it is embedded. The bushing 124 may be integral with a flared portion 126, which may have a cross section at the second blade portion end surface smaller than, substantially equal to, or larger than a cross section of the fitting 140 at the end wall 148. The fitting 140 may be arranged to abut the second insert 122. The flared section 126 may be frusto-conical, with a cross section increasing toward the end surface of the second blade portion 24, which may help to distribute a compressive force exerted on the second insert 122 by the fitting 140. The second insert 122 may also comprise a bore 128 for receiving the fastener 112. The bore 128 may be threaded along an entirety of its length or may be threaded only at an end portion 128a and may have an unthreaded portion disposed between the threaded portion and the blade portion end surface. By providing an unthreaded section of the bore 128, the fastener 112 may have an unsupported, free length allowing a greater deflection of the fastener 112 for a given bending moment. This can result in the fastener 112 carrying a lower load and thereby reduce the likelihood of failure of the fastener 112.

The first inserts 102 may be steel, the second insert 122 may be steel, and/or the fitting 140 may be formed of steel. The first insert 102 and the fitting 140 may be integral due to being welded together or may be cast or otherwise manufactured as a single part.

It can be seen that the connection joint 100 is asymmetric about a plane P midway between the first and the second blade portions 22, 24 (see FIG. 5). The asymmetry of the connection joint 100 means that the connection joint 100 may be formed with a reduced number of connections. The joint may be formed using a single fastener 112 for each connection joint 100.

Also visible in FIG. 3 is a concave end 105 of the first insert 102 and a concave end 125 of the second insert 122. By providing the inserts 102, 122 with concave ends 105, 125, the inserts 102, 122 may transfer load into the blade section by having a tapered shape. The concave ends 105, 125 of the inserts are also visible in FIGS. 5, 9, and 11 to 14. The concave ends 105, 125 may have a hemi-spherical shape, or may be conical, frusto-conical or cylindrical. By providing a concave end 105, 125 of the inserts 102, 122, the surface area of the insert available to contact a body in which the insert is inserted (e.g. a blade shell) may be increased, resulting in an increased surface area and thereby improved adhesion and an improved joint. Both the first and the second inserts may have concave end shapes, which may be the same or different.

The fitting 140 may be open at a top and a bottom side between the two side walls, with a passage through the fitting 140 extending between the two open sides. This can allow easy access to the nut 152 from either side of the fitting 140 and provide a symmetrical stress profile within the fitting 140.

The view shown in FIG. 5 is a plan view, showing that the box sections of the fittings 140 may all be open in the same direction, toward the exterior of the blade, so that the insides of the fittings 140 may be accessed from the exterior of the blade and the side walls 142, 144 of the adjacent fittings 140 may be substantially parallel.

In FIG. 5, there is shown a gap between the neighbouring fittings 140. However, this gap is exaggerated for clarity in the drawings and the actual gap may be between 0-1 mm between adjacent fittings.

Figure 6:
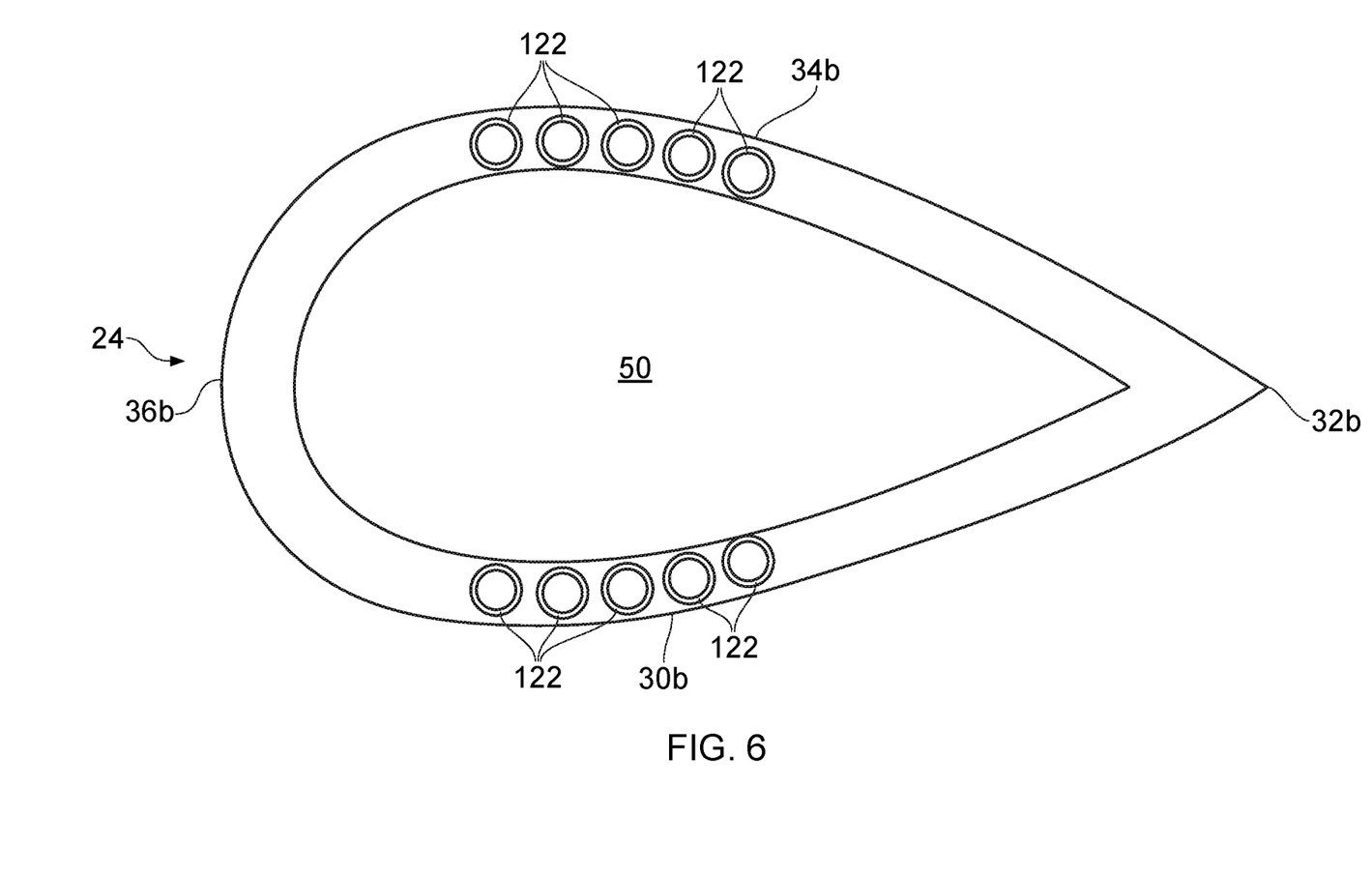
FIG. 6 shows an end view of a wind turbine blade portion.

FIG. 6 shows an end view of a blade portion 24, particularly showing a blade portion end surface. In this view, it can be seen that the blade portion 24 has a substantially hollow blade shell 50, which may be formed as a single part or may be formed as two portions separated into a top portion comprising the pressure surface 34b and a bottom portion comprising the suction surface 30b and that the inserts 122 may be embedded within the shell 50 of the blade portion 24, in both the top and bottom sections, i.e. at both the pressure side 34a and the suction side 30b of the shell 50. It will naturally be understood by the skilled person that both the first blade portion 22 and the second blade portion 24 may have a substantially similar arrangement to that shown in FIG. 6. Connection joints may also be formed within a blade, such as between internal reinforcing structures of a blade, e.g. with the inserts embedded within a spar cap or a web of a blade.

The connection joint 100 may be formed by manufacturing first and second blade portions 22, 24 with the first and second inserts 102, 122 embedded in the respective blade portions. The first insert 102 may be integral with the fitting 140 before embedding of the first insert 102 within the first blade portion 22. The fastener 112 may be secured within the second insert 122 by screwing, so that an outer thread of the fastener 112 may engage with an inner thread of the second insert 122. The fastener 112 may be inserted within the hole 148a through the second end wall 148 of the fitting 140 before or after engagement with the second insert 122. The nut 152 may then be screwed onto the fastener 112 by rotation of the nut 152 so that an inner thread of the nut 152 engages with the outer thread of the fastener 112. The nut can then be rotated around the fastener 112 until the nut 152 is engaged with the second end wall 148 of the fitting 140 and the second end wall 148 of the fitting 140 abuts the second insert 122.

Figure 7:
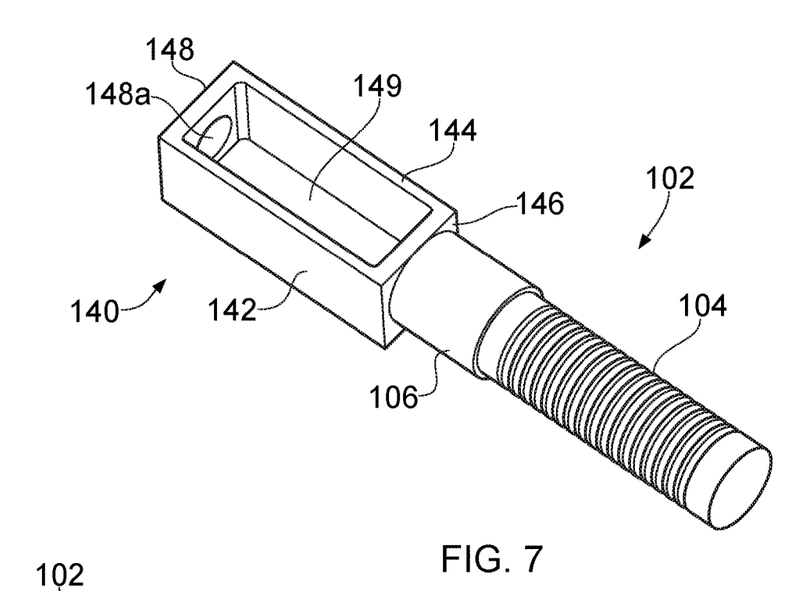
FIG. 7 shows a perspective view of a component of a connection joint.

FIG. 7 shows a perspective view of the combined first insert 102 and fitting 140. In this arrangement, it can be seen that the fitting 140 may also comprise a base 149. Providing a base may increase rigidity of the fitting 140. The base may be moveable such as by being hinged/sliding or may be removable, such as by being bolted to the fitting 140. There may also be provided a top (not shown), which may also be hinged/sliding to the fitting 140 or bolted to the fitting 140. However, providing a fitting 140 with a base 149 and no top may result in an asymmetric stress profile. Further, if the base 149 is fastened to the fitting 149, this may require bolt holes, which can result in undesirable stress concentrations. Hence, providing a base 149 may increase the chance of failure of a fitting 140. Therefore, it is desirable for the fitting to have a passage extending through it between the two side walls, i.e. the rectangular annulus.

Figure 8:
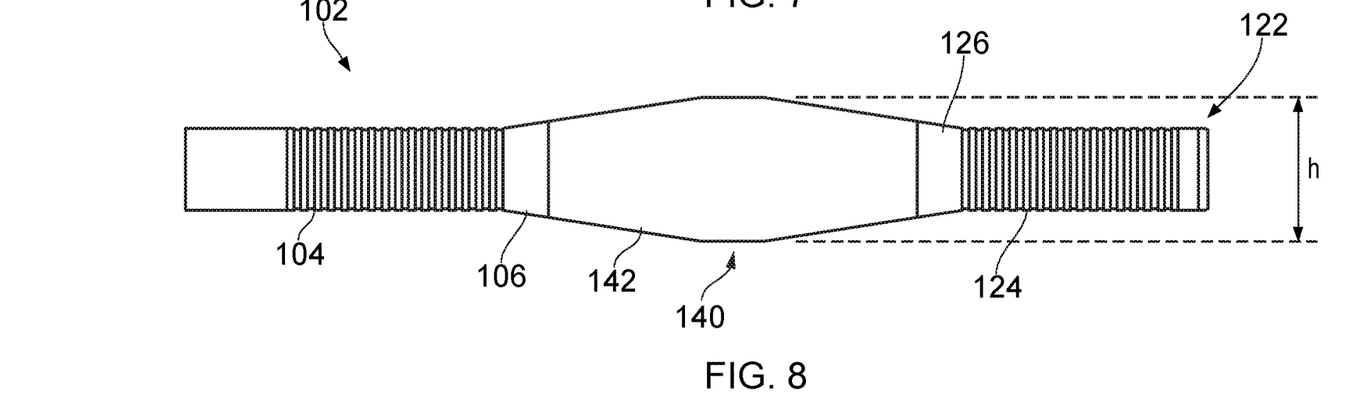
FIG. 8 shows a side view of certain components of a wind turbine blade joint.

FIG. 8 shows a side view of the first and second inserts 102, 122 and fitting 140. In this arrangement, it can be seen that the side walls 142, 144 of the fitting 140 have a height h which increases towards a midpoint of the fitting 140. The side walls may therefore be substantially diamond shaped or rhombus shaped.

The increase in cross section of the side walls 142, 144 may help to avoid buckling of the fitting 140 due to bending loads. It is also desirable that the side walls 142, 144 have a constant thickness in order to allow multiple fittings 140 to be arranged in parallel as shown in FIG. 5. Hence, a variation in the height h of the side walls 142, 144, and in particular an increase in height h toward a midpoint of the side walls 142, 144 is advantageous. By having a height h greater at a midpoint of the fitting 140 and lower at the first and second end walls 146, 148 of the fitting 140, the fitting 140 may be strongest where the bending moment is greatest and may have a lower overall weight than a fitting of constant height h. The tapered shape may also reduce a stress concentration, as would occur if there was a sudden discontinuity between the fitting 140 and the first insert 102.

Figure 9:
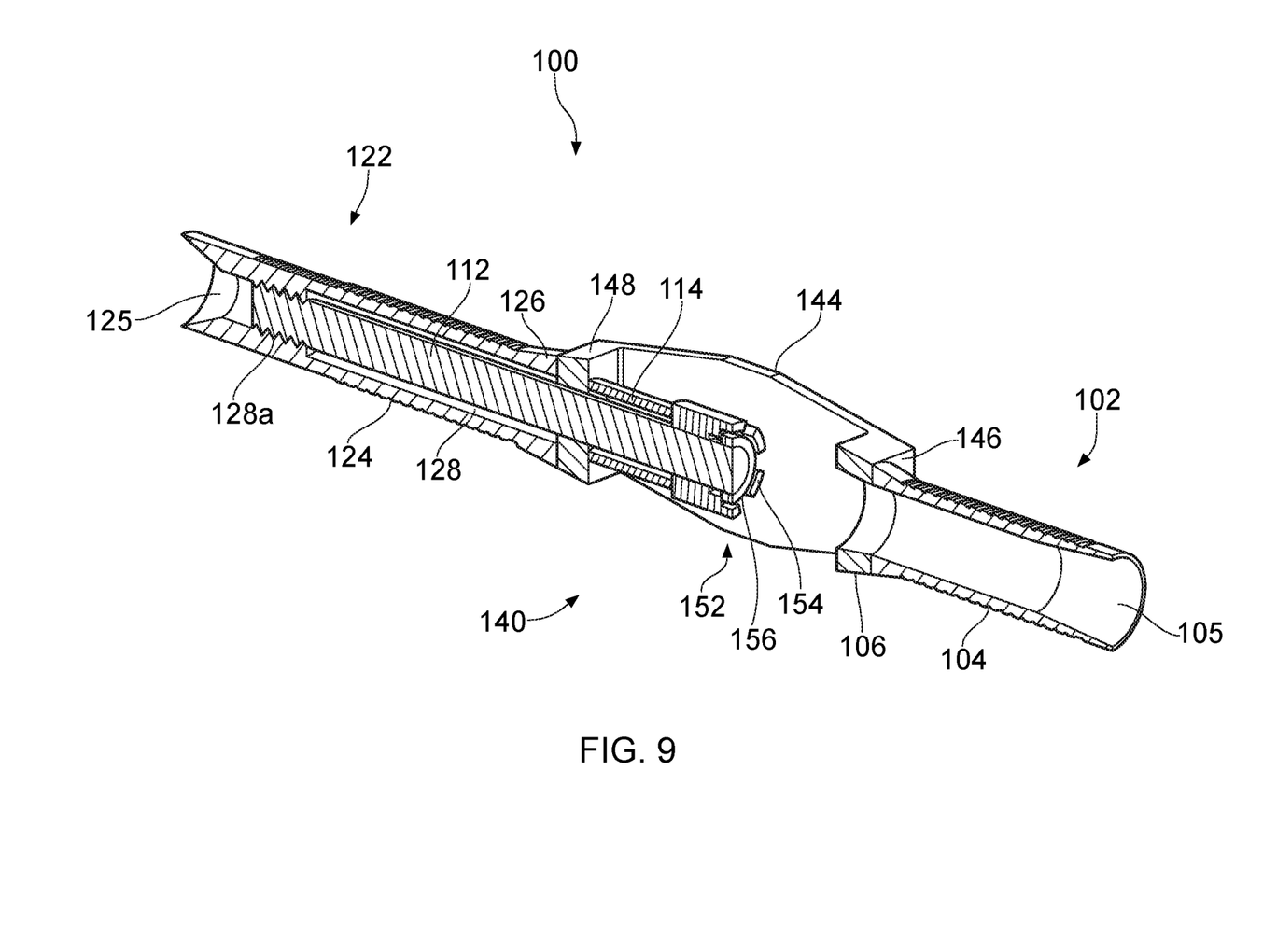
FIG. 9 shows a cutaway view of certain components of a wind turbine blade joint.

FIG. 9 shows a cross section of the connection 100. It is visible that the bore 128 through the second insert 122 may have a threaded portion 128a only at an end section thereof, and may have an unthreaded section between the threaded portion 128a and the fitting 140. The fastener 112 may extend through the bore 128 and may have a sleeve 114 disposed between an end wall 148 of the fitting 140 and the nut 152. The sleeve 114 has a function of allowing a longer fastener 112 to be used.

In use there are two load paths in the connection joint, for transferring bending loads between the first blade portion and the second blade portion 24 (or vice versa).

A first load path extends from the first blade portion 22, into the first insert 102, into the fitting 140 and along the side walls 142, 144 of the fitting, into the second insert 122 where the end wall 148 of the fitting 140 abuts the second insert 122, then into the second blade portion 24.

A second load path is the same as the first load path, but in addition load is transferred from the fitting 140 to the second insert via the fastener 112.

It is desirable to reduce the load that travels through the fastener 112, so as to reduce the stress on the fastener to keep it within its fatigue and extreme load limits. In other words, it is desirable to make the first load path the preferred path for loads. This is achieved by using a longer fastener 112, as a relatively longer fastener 112 will have a higher flexibility compared to a relatively shorter fastener. The length of the fastener can be increased as shown by two mechanisms—(i) the thread 128a on the second insert 122 is at a distal end of the insert, far from the fitting 140; and (ii) the sleeve 114.

For this reason, the sleeve 114 may have a length which is greater than one quarter of the length of the fitting in a direction along the fastener 112, optionally, the length of the sleeve 114 may be greater than half the length of the fitting 140. When load travels through the fastener 112, the loads will also travel along the sleeve 114. The sleeve 114 will have some flexibility which will also act to reduce the stiffness of the second load path, also making the first load path the preferred load path By comparison, were a shorter fastener 112 to be used it would have less flexibility, so that the fastener 112 would carry a relatively greater portion of the bending load.

The nut 152 is shown as having a plurality of circumferential castellations 154 and recesses 156, which may also be described as battlement-shaped. By providing castellations 154, a tool may rotate the nut 152 while having a radius equal to or less than the radius of the nut 152. The tool may therefore be received on an end face of the nut 152 only. Therefore, such a nut 152 allows a tool to be used which can exert a high torque while being useable in a confined space. This also allows the diameter of the fastener 112 and the nut 152 to be maximised for a given size of fitting 140.

Figure 10:
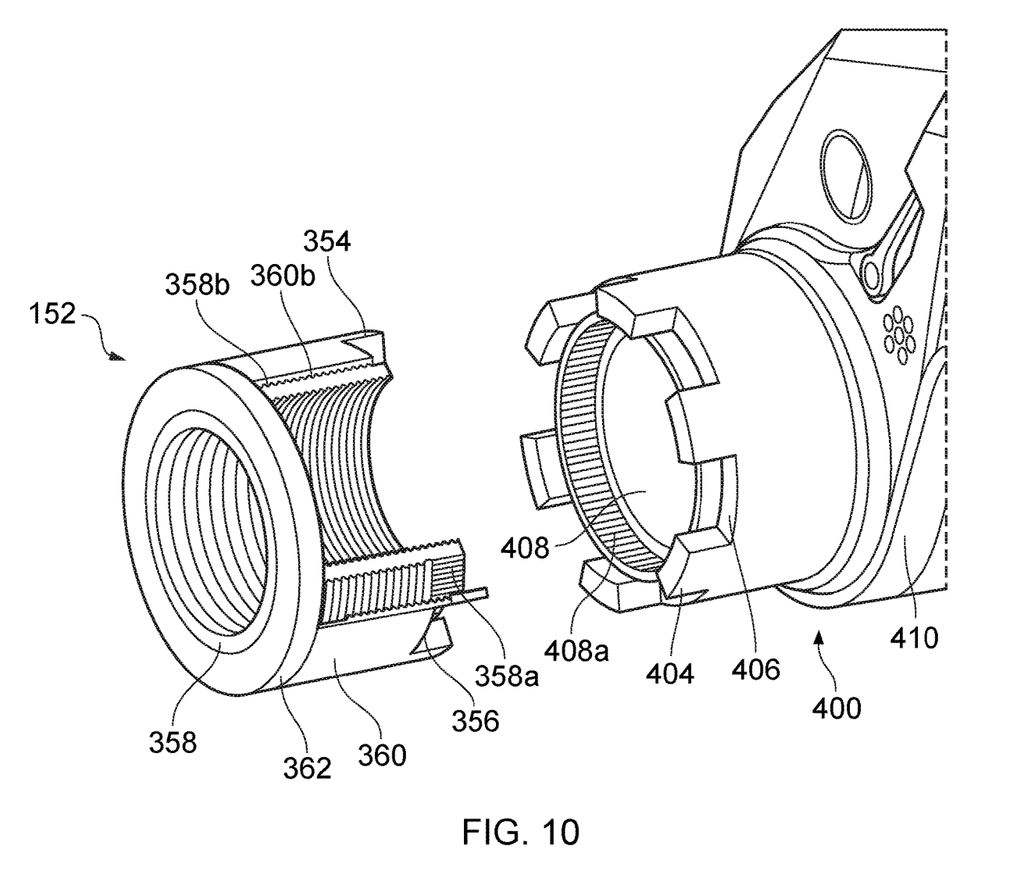
FIG. 10 shows a nut for use in a wind turbine blade joint and a tool for tightening said nut.

FIG. 10 shows a nut 152 for the connection joint 100, for tightening and tensioning the fastener without imparting a high torque to the fastener. The nut 152, which may be expandable in an axial direction, i.e. along a fastener to which the nut is attached, comprises three parts, an inner sleeve 358, an outer sleeve 360 and a washer 362. The inner sleeve 358 is freely rotatable relative to the washer 362 and the inner sleeve 358 has axial grooves 358a, which may cooperate with corresponding axial grooves 408a of a tool 400 arranged to secure the nut 152. The tool 400 comprises an inner, stationary ring 408, having inner axial grooves 408a and an outer ring 406, which may be driven to rotate by driving means 410, the outer ring 406 has castellations 404, arranged to cooperate with recesses 356 between the castellations 354 of the outer sleeve 360 of the nut 152, such that the outer sleeve 360 can be rotated relative to the inner sleeve 358. The outer sleeve 360 comprises an internal thread 360b, which is arranged to cooperate with an external thread 358b of the inner sleeve 358. By the interaction between the threads 358b, 360b, by rotating the outer sleeve 360, and with the inner sleeve 358 remaining stationary, the inner sleeve 358 may be moved axially while not rotating. The inner sleeve 358 also has an inner thread, which may be engaged with a fastener and therefore, by moving the inner sleeve 358 axially, the fastener may be stretched axially without a further torque being imparted to the fastener.

Overall, therefore, the nut 152 may be operated such that an initial torque is applied to a fastener within the nut 152 until a desired or predetermined torque is reached. After the predetermined torque has been reached, the nut 152, or at least an outer sleeve 360 of the nut 152, may be rotated such that a tension within the fastener is increased without a further torque being applied to the fastener. This may allow a very precise tensile pre-stress to be applied to the fastener 112.

In other examples, different nuts may be used, such as a Superbolt™ multi-jackbolt tensioner or a 12 point tension nut.

Figure 11:
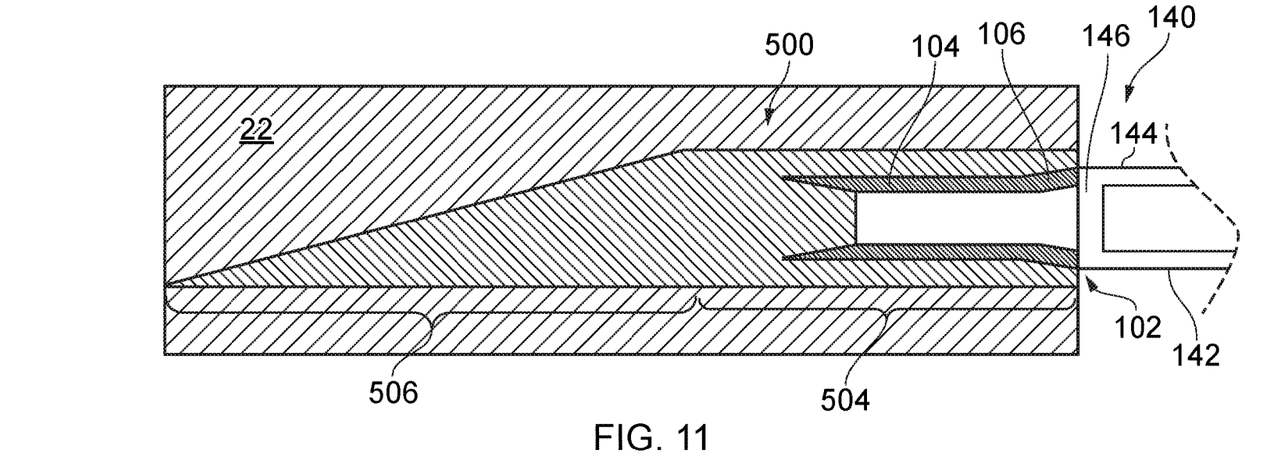
FIG. 11 shows a cross section of an insert embedded within a wind turbine blade portion.

FIG. 11 shows a first insert 102 embedded in the first blade portion 22. The insert 102 is embedded in an elongate fibre composite body 500, which may in turn be embedded in the second blade portion 22. It may have a tapered portion 506 and a substantially cuboidal portion 504. By providing a tapered portion 506, there may be provided a greater surface area for adhering the composite body 500 to the first blade portion 22. The undulating outer surface of the bushing 104 may be wrapped in composite material, in which the fibres of the composite material may lie within grooves in the undulating outer surface and thereby the bushing 104 may be securely fixed within the composite body 500.

Figure 12:
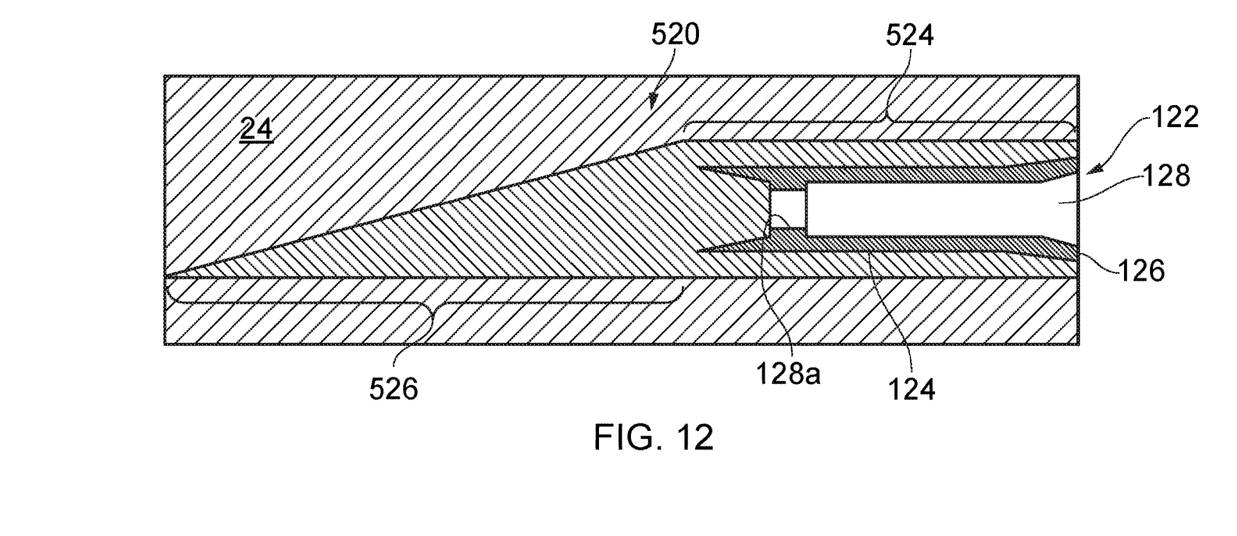
FIG. 12 shows a cross section of an insert embedded within a wind turbine blade portion.

FIG. 12 shows how a second insert 122 may be embedded in a second blade portion 24. The second insert 122 may be embedded in a second elongate fibre composite body 520, which may in turn be embedded in the second blade portion 24. The undulating outer surface of the bushing 124 may be connected to the second elongate fibre composite body 520 in substantially the same way the outer surface of the first bushing 104 may be secured within the first body 500. The second elongate fibre composite body 520 may also comprise a tapered portion 526 and a substantially cuboidal portion 524 in a similar fashion to the first elongate fibre composite body 500.

As can be seen by comparing FIGS. 11 and 12, the first bushing 104 may be shorter than the second bushing 124 and the second insert 124 may extend further into the second elongate fibre composite body 520 than the first insert may extend into the first elongate fibre composite body 500. By providing a longer second insert 124, the fastener 112 may have a longer free section to allow greater deflection for a given bending moment. This may be beneficial for the reasons explained above in that the loading on the fastener 112 can be reduced.

Figure 13:
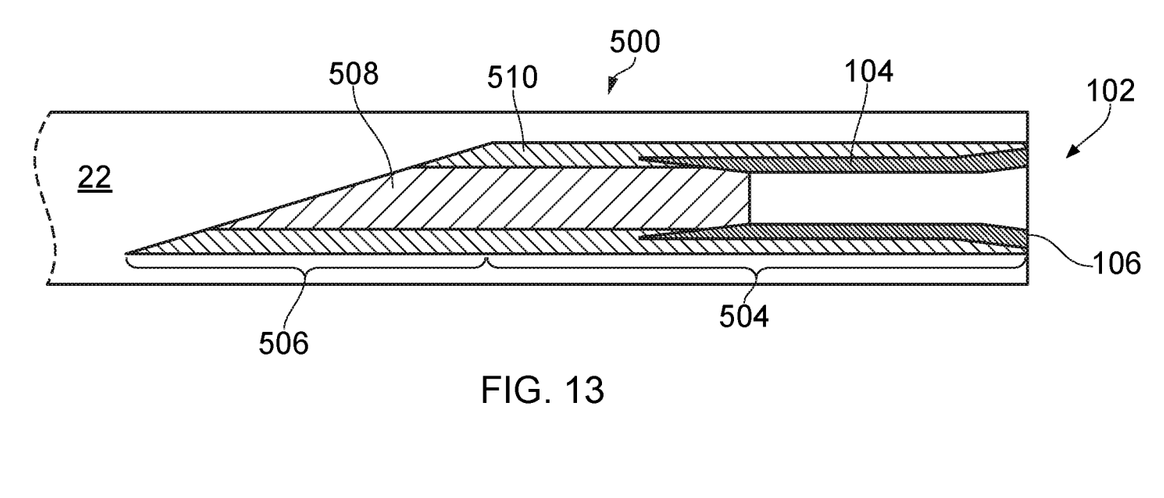
FIG. 13 shows a cross section of an insert embedded within a wind turbine blade portion.

FIG. 13 shows how either of the elongate fibre composite bodies 500, 520 may be constructed. The body may comprise a core 508, which may be surrounded by composite windings 510, which may be substantially cylindrically wound around both the core 508 and the insert 102, including the bushing 104 of the insert and the cylindrical portion 106 of the insert. The core 508 may be formed from fibre glass or from a different low density material, such as a plastic core material.

Figure 14:
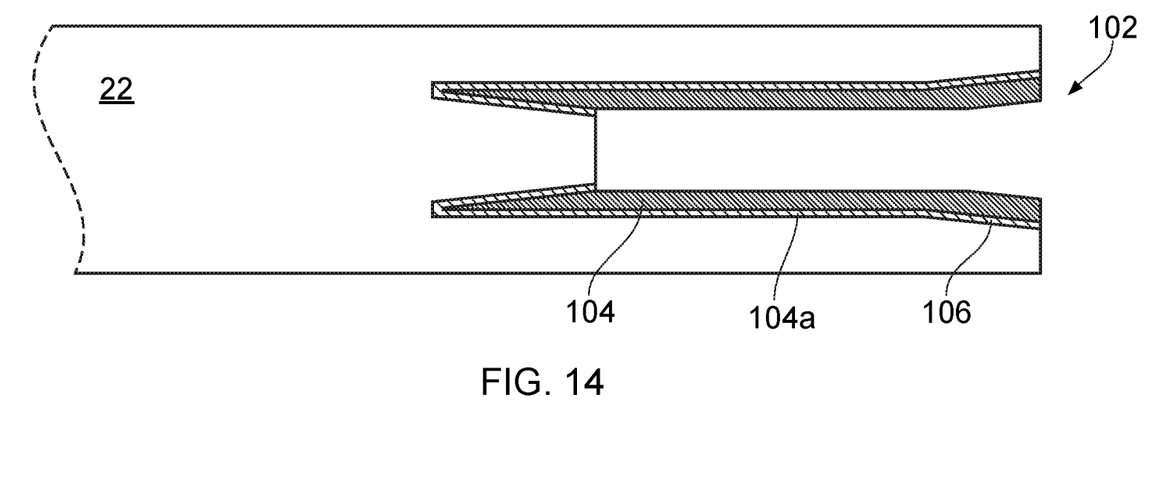
FIG. 14 shows a cross section of an insert embedded within a wind turbine blade portion in a different embodiment.
Figure 15:
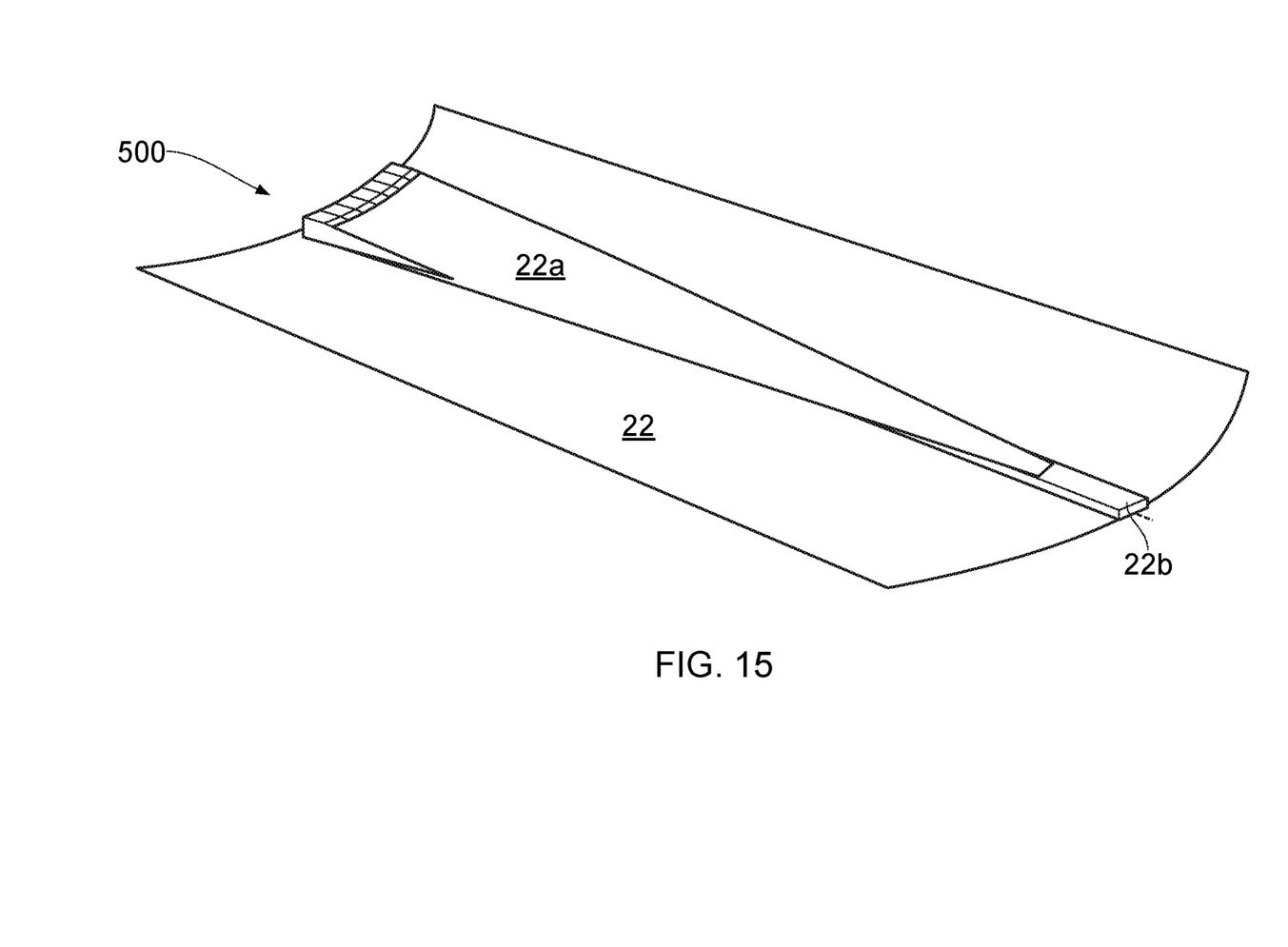
FIG. 15 shows a perspective view of an interior of a wind turbine blade portion.

Alternatively, as shown in FIG. 14, the insert 102 may be embedded directly into the blade portion 22. In this embodiment, a recess may be formed in the blade portion 22 by drilling or machining and the insert 102 may be adhered to the inside of the recess. Adhesive 104a may be used to fix the insert 102 inside the blade portion 22. In this arrangement, the bushing 104 may have a substantially smooth cylindrical surface.

The alternative shown in FIG. 14 may be applied to either the first insert 102 or the second insert 104 at either the first blade portion 22 or the second blade portion 24.

The composite bodies 500, 520 may be embedded within a spar cap, as shown in FIG. 16. The spar cap 22a may comprise a composite slab 22a, such as a carbon slab or a fibre glass slab, adhered to or integrated with a blade shell. The slab 22a may taper so as to have a width (in a chordwise direction which reduces in a direction moving away from the joint, and may be fixed to a carbon or fibreglass spar 22b. By embedding the composite bodies 500, 520 within a spar cap 22a, the load transferred across the joint can be directly transferred into a load bearing structure of the blade.

By using a composite slab or a spar cap which diverges or increases in width toward a blade portion end surface, a greater number of fasteners may be used at a joint between two blade portions.

While references to the first and second blade portions above refer to a portion nearer the tip and a portion nearer the root, it will be understood that the terms first and second blade portions are not so limited and that the above teaching may be applied in an opposite manner, with the first blade portion being nearer to the blade tip and the second blade portion being neared to the blade root.

Although the invention has been described above with reference to one or more preferred embodiments, it will be appreciated that various changes or modifications may be made without departing from the scope of the invention as defined in the appended claims.

The invention claimed is:

1. A wind turbine blade comprising:
   a first blade portion having a shell that defines a suction side, a pressure side, a leading edge, and a trailing edge of the blade, the first blade portion further including a first blade portion end surface at one end of the first blade portion;
   a second blade portion having a shell that defines a suction side, a pressure side, a leading edge, and a trailing edge of the blade, the second blade portion further including a second blade portion end surface at one end of the second blade portion, wherein the first blade portion and the second blade portion are configured to be coupled together at the first and second blade portion end surfaces; and
   a connection joint for coupling the first and second blade portions together, wherein the connection joint includes:
      a first insert embedded in the first blade portion;
      a fitting integral with the first insert and projecting from the first blade portion end surface toward the second blade portion end surface;
      a second insert embedded in the second blade portion;
      a fastener including a threaded shaft extending from the second insert and within the fitting; and
      a nut disposed within in the fitting, wherein the nut engages the fastener to fasten the second insert to the fitting.

2. The wind turbine blade according to claim 1, wherein the second insert has an internal bore having a threaded portion for receiving an end of the fastener, and wherein the internal bore also has an unthreaded portion for receiving the fastener.

3. The wind turbine blade according to claim 1, wherein the fitting has a first end wall integral with the first insert and a second end wall opposite the first end wall, the second end wall having a through hole for receiving the fastener.

4. The wind turbine blade according to claim 3, wherein the fitting further comprises at least two side walls extending between the first and second end walls.

5. The wind turbine blade according to claim 4, wherein the fitting has a covered base and/or top between the two side walls.

6. The wind turbine blade according to claim 4, wherein the fitting is open between the two side walls for receiving a tool for tightening the nut.

7. The wind turbine blade according to claim 6, wherein the fitting is open between the two side walls from two opposite faces of the fitting, the fitting having a passage extending through it between the two side walls.

8. The wind turbine blade according to claim 4, wherein the side walls have a cross section which increases towards a middle of the fitting between the end walls, and wherein the side walls have a constant thickness.

9. The wind turbine blade according to claim 3, wherein the fastener has an external thread and wherein tightening the nut clamps the second insert against the second end wall of the fitting.

10. The wind turbine blade according to claim 9, wherein the nut is adapted to clamp the second insert against the second end wall of the fitting by tensioning the fastener while exerting substantially no torque on the fastener.

11. The wind turbine blade according to claim 9, wherein the nut is expandable in a direction along the fastener.

12. The wind turbine blade according to claim 9, wherein the nut is adapted to receive a tool on an end face of the nut only.

13. The wind turbine blade according to claim 9, further comprising a sleeve extending around the fastener, the sleeve being disposed between the nut and the second end wall.

14. The wind turbine blade according to claim 1, wherein the fastener is a stud, or a bolt, or a shaft.

15. The wind turbine blade according to claim 1, wherein the first insert and/or the second insert has an undulating outer surface.

16. The wind turbine blade according to claim 1 wherein the second insert includes a bushing.

17. The wind turbine blade according to claim 1, wherein the inserts are metallic.

18. The wind turbine blade according to claim 1, wherein the second insert extends into the second blade portion further than the first insert extends into the first blade portion.

19. The wind turbine blade according to claim 1, wherein the second insert is longer than the first insert.

20. The wind turbine blade according to claim 1, wherein the first insert and/or the second insert are secured within respective elongate fibre composite bodies, and the respective inserts are embedded at one end of the respective elongate fibre composite bodies.

21. The wind turbine blade according to claim 1, wherein the first insert and/or the second insert is integrated within an end face of a spar cap of the respective first and/or second blade portions.

22. The wind turbine blade according to claim 1, wherein the connection joint is asymmetric about a plane midway between the first and the second blade portion end surfaces.

23. The wind turbine blade according to claim 1, wherein the first and the second blade portion end surfaces are spaced apart and wherein the fitting extends between the first and the second blade portion end surfaces.

24. The wind turbine blade according to claim 1, further comprising at least one further connection joint for coupling the first and second blade portions together, wherein each of the further connection joints includes:
- a respective first insert embedded in the first blade portion;
- a respective fitting integral with the respective first insert and projecting from the first blade portion end surface toward the second blade portion end surface;
- a respective second insert embedded in the second blade portion; and
- a respective fastener for fastening the respective second insert to the fitting.

25. A method of manufacturing a wind turbine blade comprising:
- providing a first blade portion having a shell that defines a suction side, a pressure side, a leading edge, and a trailing edge of the blade, the first blade portion further including a first blade portion end surface at one end of the first blade portion, with a first insert embedded in the first blade portion at the first blade portion end surface, and a fitting integral with the first insert;
- providing a second blade portion having a shell that defines a suction side, a pressure side, a leading edge, and a trailing edge of the blade, the second blade portion further including a second blade portion end surface at one end of the second blade portion, with a second insert embedded in the second blade portion at the second blade portion end surface;
- bringing the first and second blade portions together such that the fitting projects from the first blade portion end surface toward the second blade portion end surface;
- connecting a fastener having a threaded shaft to the second insert so as to extend therefrom and within the fitting; and
- connecting a nut to the fastener within the fitting so as to couple the first blade portion and the second blade portion together at the first and second blade portion end surfaces.

* * * * *